Figure 14:
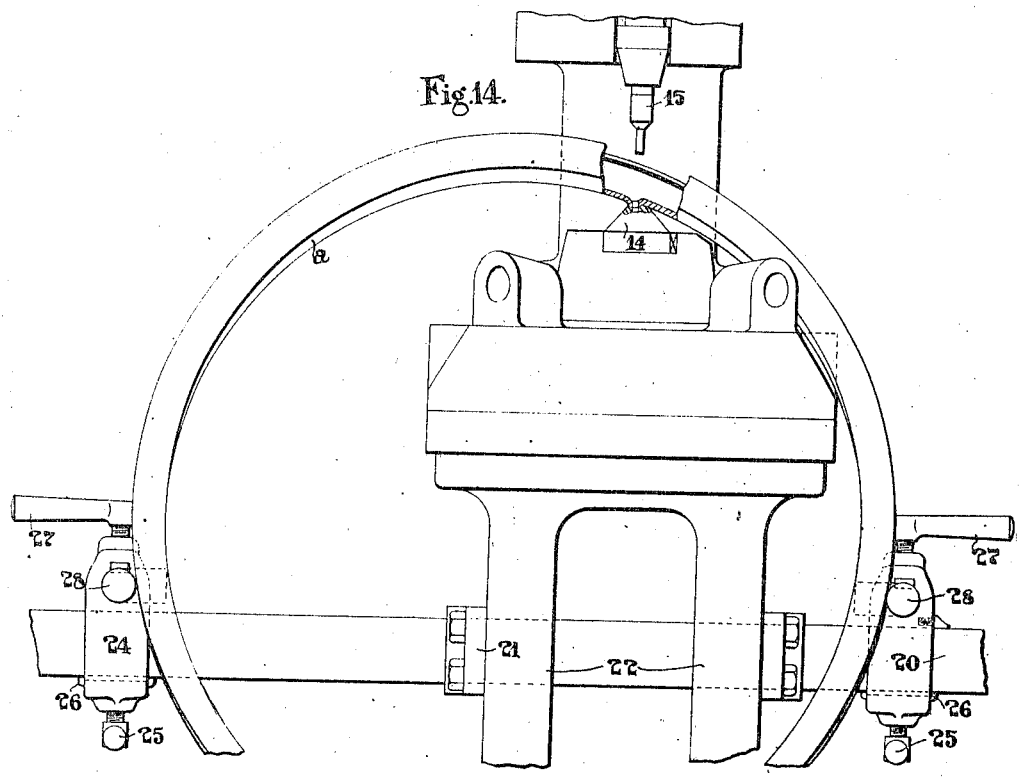

J. V. PUGH.
PROCESS FOR THE MANUFACTURE OF WIRE SPOKED RIMS.
APPLICATION FILED MAR. 6, 1909.
1,030,428.
Patented June 25, 1912.
8 SHEETS—SHEET 1.
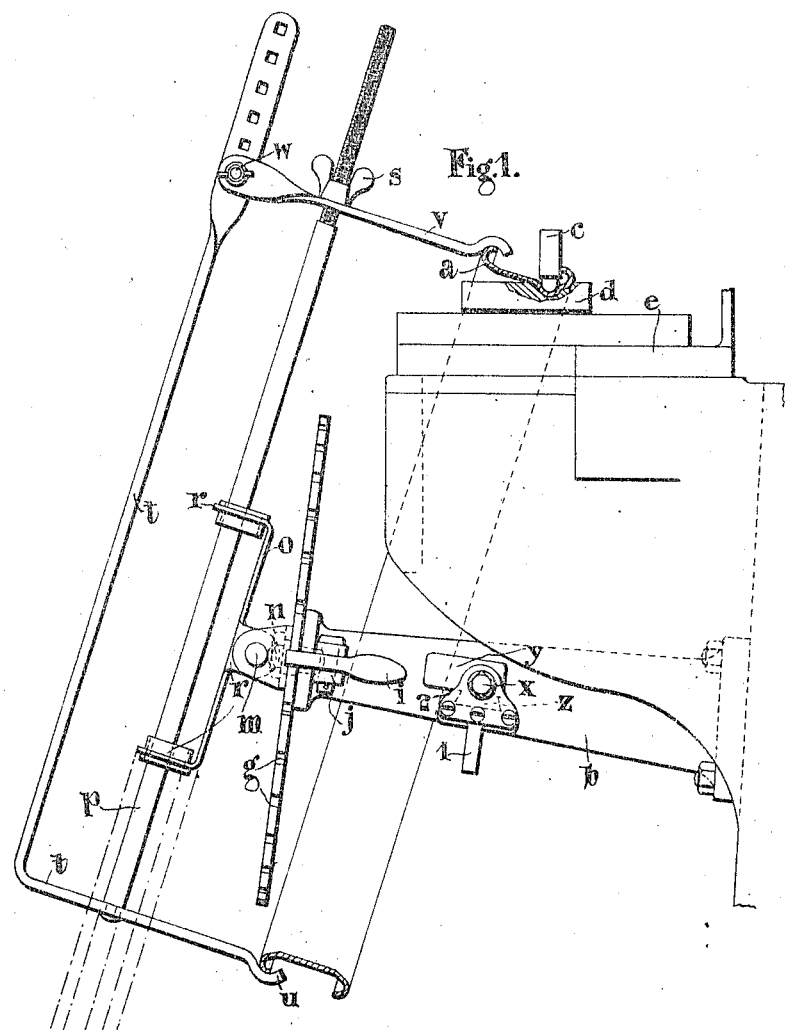
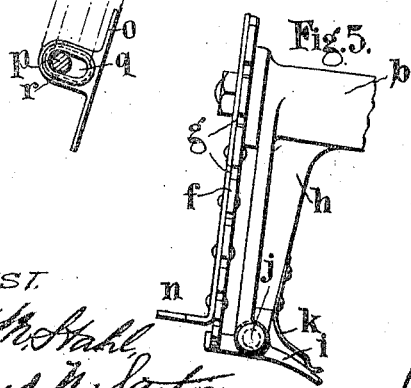
ATTEST.
INVENTOR.
JOHN VERNON PUGH.

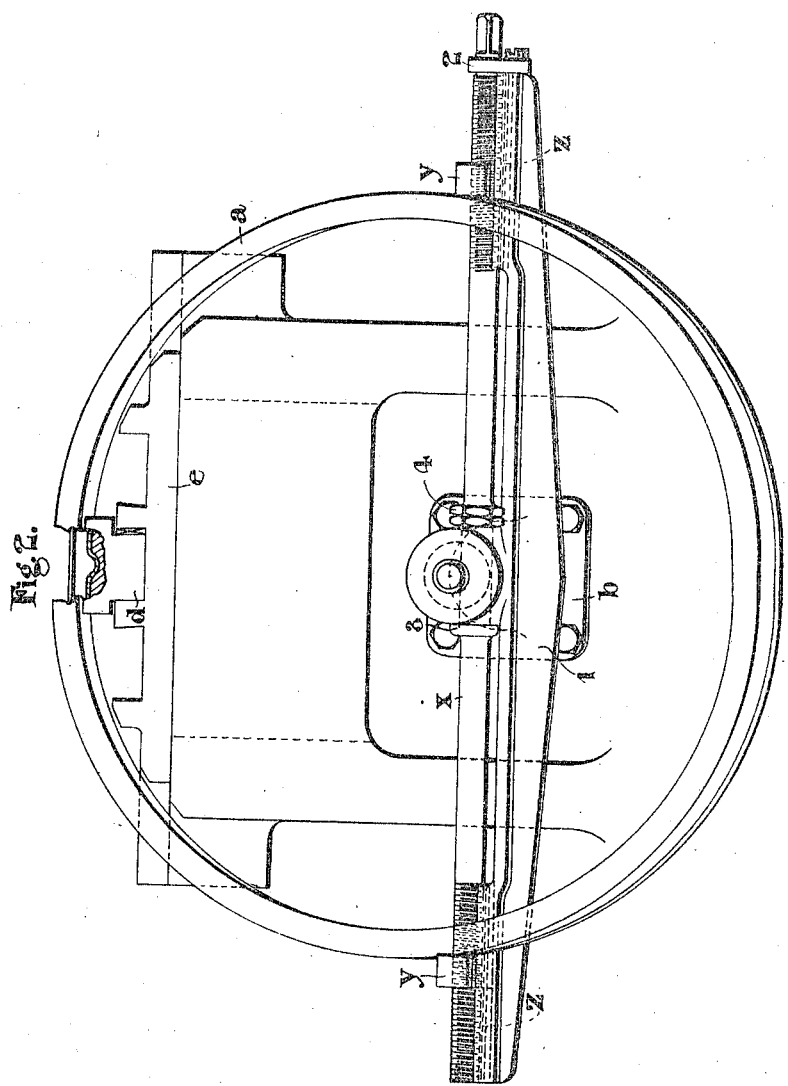

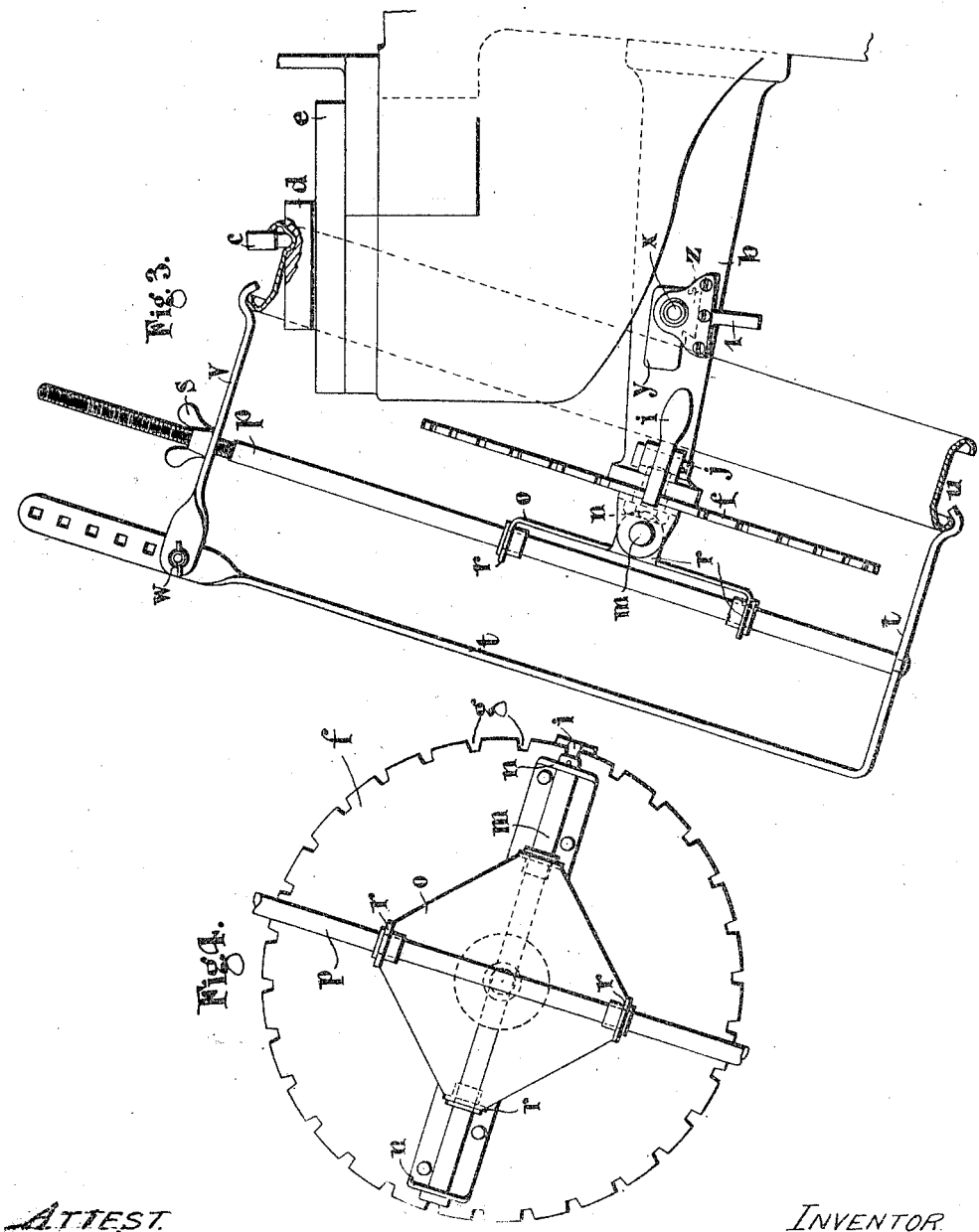

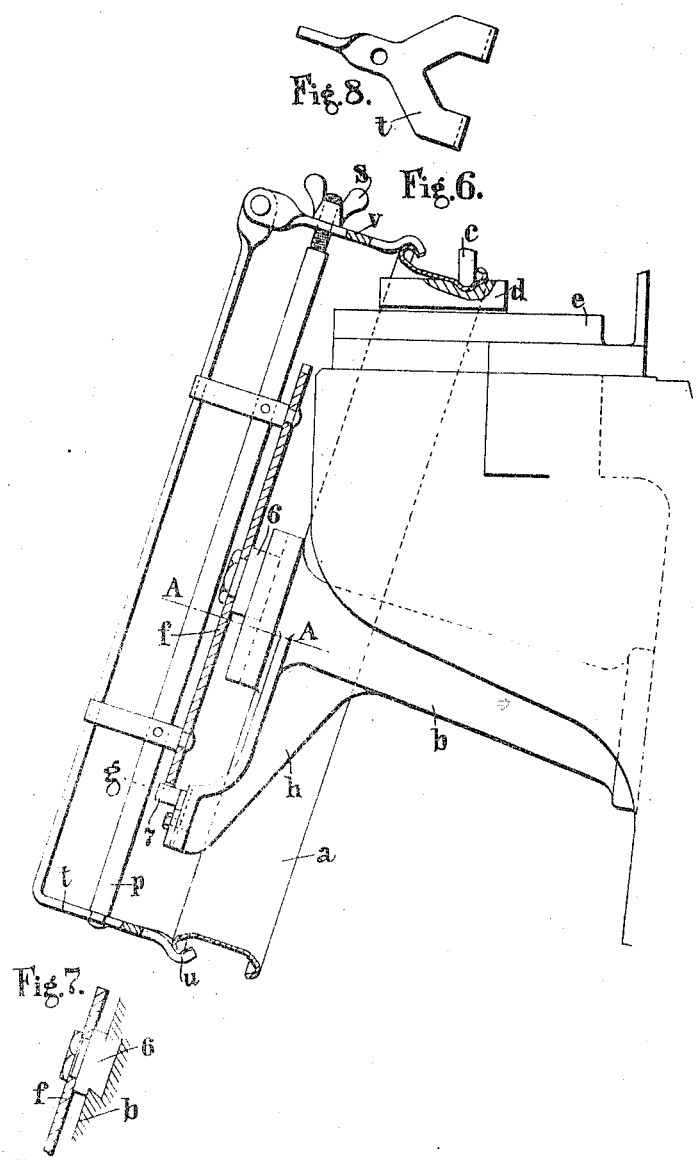

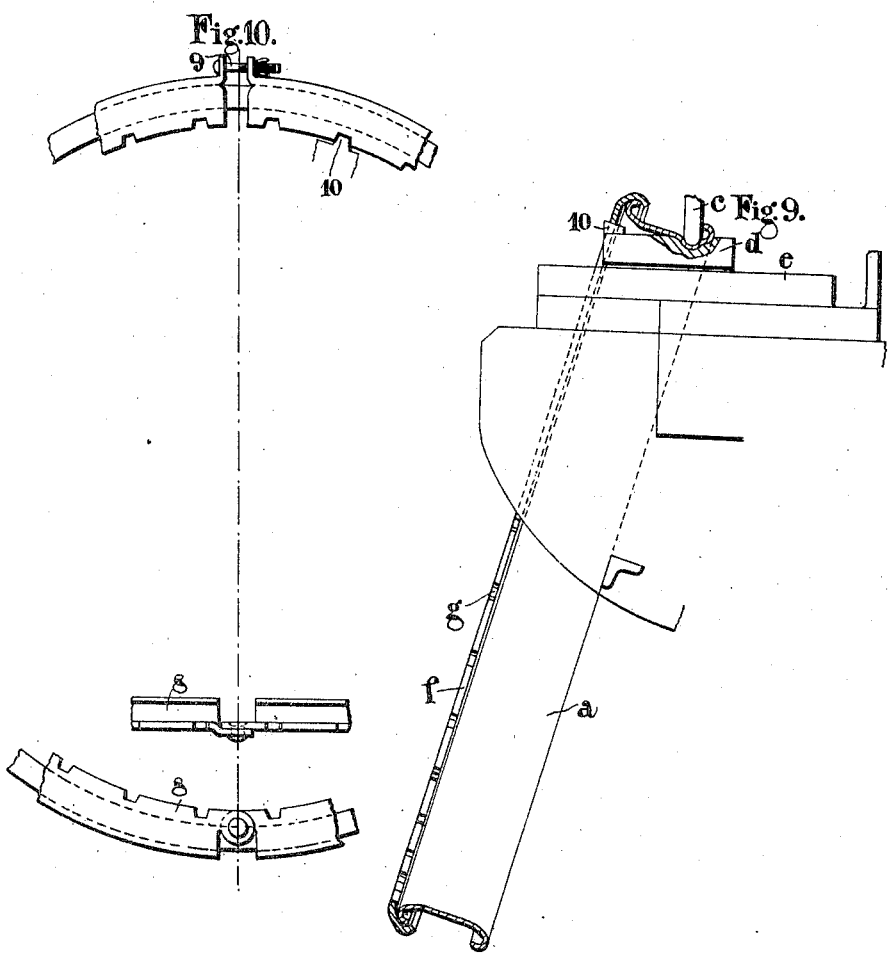

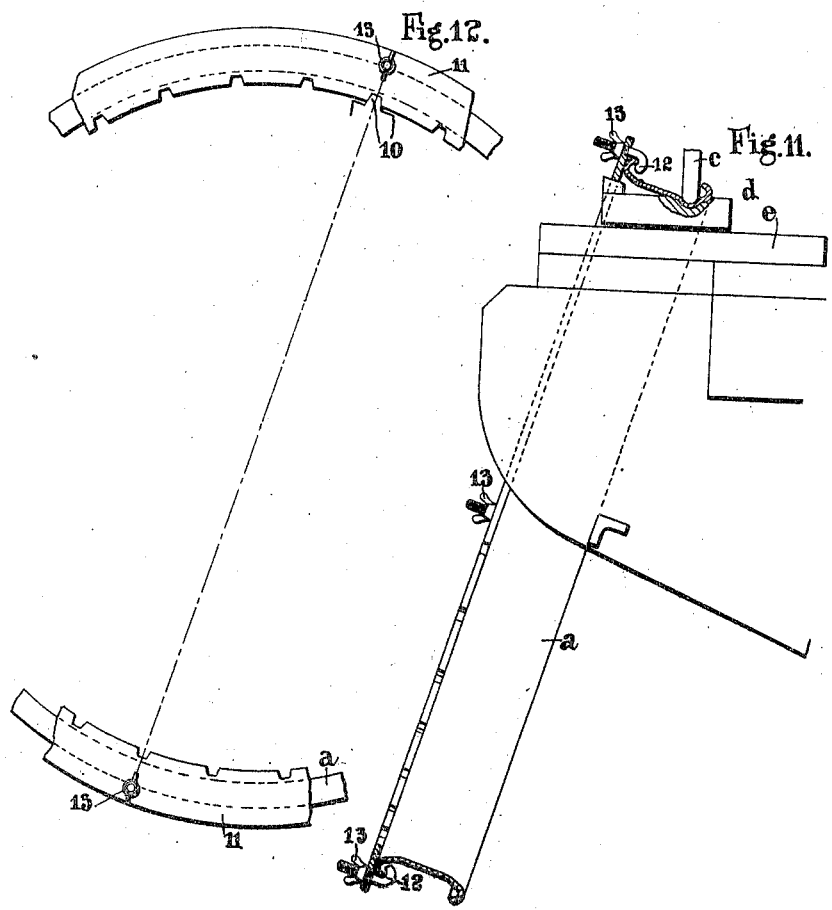

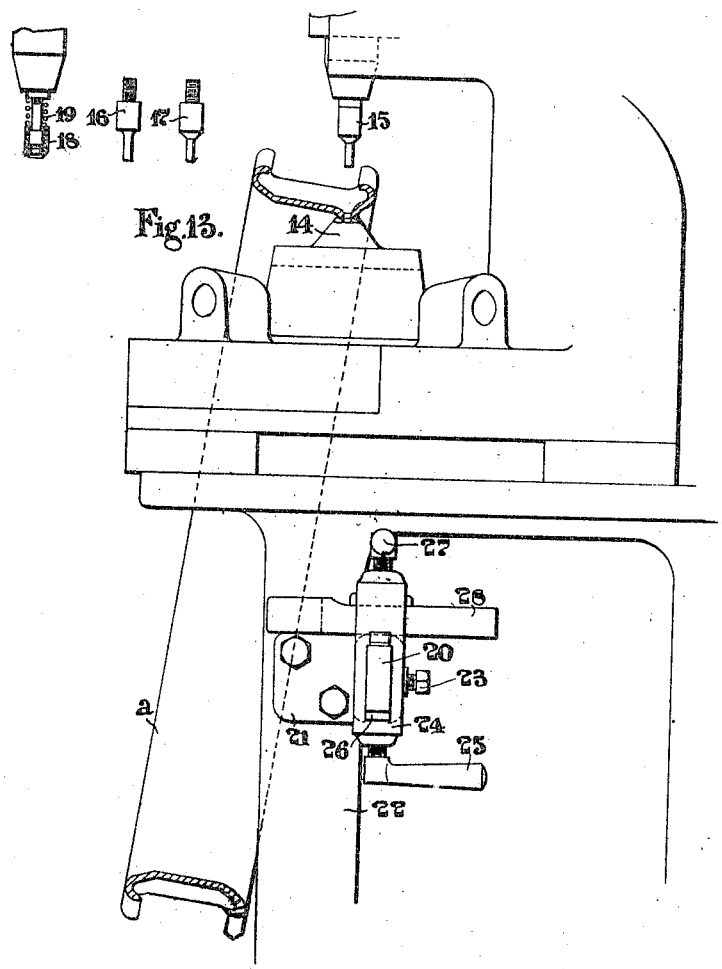

J..V. PUGH.
PROCESS FOR THE MANUFACTURE OF WIRE SPOKED RIMS.
APPLICATION FILED MAR. 6, 1909.

1,030,428.

Patented June 25, 1912.

8 SHEETS—SHEET 8.

ATTEST.
Bent M. Stahl
Edward N. Sarton

INVENTOR.
JOHN VERNON PUGH.
By Spear, Middleton, Donaldson & Spear
ATTY'S.

UNITED STATES PATENT OFFICE.

JOHN V. PUGH, OF ALLESLEY, ENGLAND.

PROCESS FOR THE MANUFACTURE OF WIRE-SPOKED RIMS.

1,030,428. Specification of Letters Patent. Patented June 25, 1912.

Application filed March 6, 1909. Serial No. 481,636.

*To all whom it may concern:*

Be it known that I, JOHN VERNON PUGH, a subject of the King of Great Britain and Ireland, and residing at Guiting House, Allesley, in the county of Warwick, England, have invented certain new and useful Improvements in and Relating to a Process for the Manufacture of Wire-Spoked Rims, of which the following is a specification.
This invention relates to improvements in the manufacture of wire-spoked metal rimmed wheels, and in the means employed in such manufacture, and it is especially applicable to tangent spoked metal rimmed wheels for motor cars, bicycles and the like, in which the wire spokes are provided with nipples socketed in countersinks formed in the metal rim.

In tangent wire spoked wheels as hitherto manufactured, the rims have been drilled and countersunk tangentially by a cutting operation which removes some of the metal of the rim. It is however exceedingly difficult to effect the tangential drilling and countersinking in exactly the direction in which the spoke is to be tensioned, but unless the direction is exact and a considerable amount of metal be cut away to effect a clean countersink all around the hole, the nipples will not bed properly on their seatings when the spoke is tensioned, in consequence of which water may leak through the spoke holes in the rim into the tire, and the spokes become more or less bent.
The object of this present invention is to provide a method of manufacture whereby the difficulty hitherto experienced in satisfactorily piercing and countersinking depression for tangential spokes may be easily overcome, and to provide simple and inexpensive means whereby the new mode of dealing with the wheels may be readily carried into effect.

The invention consists in the features hereinafter described and particularly pointed out in the appended claim.

To carry out the first operation or the formation of the depressions according to my invention, a rim, is mounted in a carrier or chuck with the rim resting on the die and positioned so that the punch shall produce radial or nearly radial depressions, the axis of which will all lie in one plane the angle between this plane and the central plane, of the rim being determined by the tilt of the carrier relative to the axis of the punch.

The rim carrier or chuck forms one element of a device performing the functions of an Oldham coupling the other element of which is joined to a divider plate or the like rotatably mounted upon a spindle or bracket carried from a fixed part, the device permitting the wheel rim to be raised clear of the die and rotated as required. After each depression is produced, the divider plate is rotated through a predetermined angle whereby the rim is brought into position for receiving the next depression.

Any convenient form of apparatus performing the functions of the well known Oldham coupling may be used for the purpose of this invention and when an Oldham coupling device is referred to herein it is intended to include the mechanical equivalents thereof which will give a uniform angle of rotation irrespective of the position of the center of the rim and the center of the division plate.

If it is desired to mount rims of different diameters in the same carrier chuck, the distance between the centers of the dividing plate and rim will not be constant and such a device as the above mentioned Oldham coupling becomes necessary.

When the rim carrier is only adapted for one fixed diameter of rim, an Oldham coupling is unnecessary and instead the divider plate may be mounted on the same spindle as the chuck which holds the rim, this spindle itself being allowed freedom of movement vertically. With this arrangement the pawl or stop engaging the division plate might be arranged vertically below the spindle so that, in lifting the rim sufficiently for the last formed depression to clear the die, the division plate would be disengaged from the stop and permit the rim to be rotated as far as required, and on lowering the rim, it would be positioned for the next depression by the engagement of the stop with the next slot in the division plate. The arrangement however involves the lifting of a considerable weight after each depression has been formed, and it is consequently not so desirable a construction as that previously indicated.

To carry out the second operation according to my invention viz. the piercing and countersinking of the depressions, in the correct direction for the tangential direction of each spoke, the rim is held by stops to locate the position of the said rim in its plane and to determine the angle that plane makes with the vertical.

Figure 15:
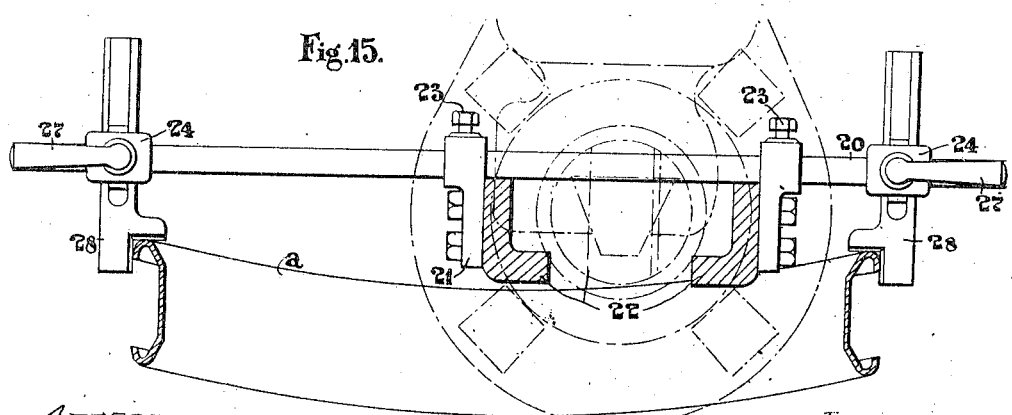

Referring now to the accompanying drawings which form part of my specification, Figure 1 shows a side elevation of one form of depression forming machine for carrying out my invention in which the indexing or division plate is not parallel to the plane of the rim. Fig. 2 is a part end elevation of the same machine as in Fig. 1 showing the rim supporting means. Fig. 3 shows a side elevation of a depression forming machine for carrying out my invention in which the indexing or division plate is parallel to the plane of the rim. Fig. 4 is a part end elevation of the same machine as in Fig. 3 showing the indexing plate and Oldham coupling device. Fig. 5 is a detail drawing of the indexing plate and ratchet stop for regulating rotation of the rim. Fig. 6 shows an alternative form of the holding and dividing means. Fig. 7 is a section on the line $a\ a$, Fig. 6. Fig. 8 is a plan of the cranked bar, $t$, showing forked short arm. Figs. 9 and 10 are part side and end elevation showing an alternative form of dividing means. Figs. 11 and 12 are part side and end elevation showing a further alternative form of dividing means. Figs. 13 and 14 show side and end elevations respectively of one form of punching machine for carrying out the second part of my invention. Fig. 15 shows the rim positioning and supporting means used in the punching machine.

In the particular form of depression forming machines for the purpose of my invention shown in Figs. 1 and 2, the wheel rim $a$, is held by suitable supporting and rotating means to be hereafter described, so that the part of the rim in which the depression is to be formed, rests upon the die, $d$, and is directly under the punch, $c$. The means whereby the punch, $c$, is operated are not shown or described as they form no part of the present invention. The die, $d$, is supported on the table, $e$, which latter is attached to a portion of the main frame of the machine. On the bracket, $b$, which is also fixed to the main frame, is rotatably mounted the indexing or division plate, $f$, in the periphery of which there is formed a series of equidistant slots, $g$, corresponding in number to the depressions required to be formed in the rim $a$. The bracket, $b$, also carries an arm $h$, at the end of which the lever $i$, is mounted so that it is capable of oscillating about the pivot, $j$. A spring, $k$, one end of which is fixed to the arm, $h$, presses against the lever $i$, in such a manner as to keep the said lever normally in engagement with the slots, $g$, on the driving plate, $f$, which latter is thus prevented from being rotated until such a time that the lever, $i$, is moved clear of the slots, $g$.

It has been mentioned that when rims of different diameters are to be mounted in one carrier, a device such as an Oldham coupling becomes necessary and a form of this coupling adapted to be used in the present invention is shown in Figs. 1, 2, 3 and 4. One member of the form of Oldham coupling device shown in Figs. 1, 2, 3 and 4 is formed by the indexing plate, $f$, and the bar or rod, $m$, which is mounted in the two supports, $n\ n$, which are themselves fixed to the face of the said plates. The third member of the Oldham coupling device is the rod, $p$, of the rim carrier or chuck, while the intermediate member consists of a plate, $o$, carrying the four lugs, $r$, one pair of oppositely situated lugs being situated on one face of the plate, $e$, the other pair of the lugs, $r$, being situated on the other face. These lugs are so arranged that lines drawn through the pairs oppositely situated are at right angles to one another. Through one pair of these lugs passes the rod, $p$, while through the other pair passes the rod or bar $m$.

It is found that when the indexing plate, $f$, is not parallel with the plane of the rim, $a$, and is therefore not parallel to the rod, $p$, that the pair of the lugs $r$, through which the rod, $p$, passes, have to be slotted (see $q$ on drawing) to allow an inward and outward movement of the said rod, $p$, so as to compensate for the variation in the angle between the rod, $p$, and the indexing plate, $f$, as the rim, $a$, is moved forward to the next position. When however the indexing plate, $f$, is placed parallel to the plane of the rim, $a$, these slots are not necessary and the holes may be made cylindrical.

The rim carrier or chuck consists of a cranked bar, $t$, to the shorter arm of which the rod, $p$, is attached in any suitable manner. This shorter arm is also provided at its extremity with a groove, $u$, into which the turned over edge of the wheel rim, $a$, can be placed the greater dimension of the bar being preferably in contact with the wheel rim. The longer arm of the cranked bar, $t$, is flattened or twisted at the end so that its greater dimension is at right angles to the greater dimension of the rest of the bar, and at the same time it is perpendicular to the plane of the rim. Attached to this longer arm of the cranked bar, $t$, by means of a bolt and wing nut, $w$, or other suitable connecting means, is a short bar, $v$, having at its free end a groove similar to that shown at $u$. The free end of the rod or bar, $p$, passes through a suitably positioned hole in this bar, $v$, this end of the rod or bar, $p$, is also screwed and provided with a wing nut, $s$.

It will be seen that if the wheel rim $a$ is placed in the groove, $u$, the said wheel rim will be securely held by screwing down the wing nut, $s$, till the groove in the short bar, $v$, is in close contact with the rim. A series of holes are provided in the end of the longer arm of the cranked bar, $t$, and both $t$ and the rod, $p$, are made long enough to enable rims of different diameters to be held.

Through a hole in the bracket, $b$, there passes a rod, $x$, the ends of which are provided with a right and left handed thread respectively, and which engage with similar threads formed in the sliding blocks, $y$, carried in the grooved part, $z$, of the arms, 1 1, which are attached to the bracket, $b$. One end of the rod, $x$, passes through a supporting lug, 2, attached to one of the arms, 1. This end is formed in a square or other non-circular shape, so that the bar, $x$, can be rotated by means of a spanner or handle provided with a similar shaped hole and the sliding blocks, $y$ be moved toward or away from each other. These sliding blocks are provided with arms, against which the rim, $a$, rests. A shoulder, 3, and two lock nuts, 4, on the rod, $x$, and on either side of the bracket $b$ serve to hold the said rod in a central position while allowing it to rotate.

In Fig. 6, an arrangement is shown in which the indexing or division plate, $f$, is bolted to a tongue piece, 6, which slides in a groove in the bracket, $b$, as shown in Fig. 7.

The arm, $h$, of the bracket, $b$, extends vertically downward and carries at its extremity a fixed stop, 7, which engages with the slots, $g$, of the indexing plate, $f$. This stop is provided with a slot for adjusting it in position. The indexing plate, $f$, also carries the rod, $p$, and the rim holding means similar to those already described with reference to Figs. 1, 2, 3 and 4. It is evident that lifting the rim so that an already formed depression in the rim, $a$, is clear of the die $d$, will also raise the indexing plate $f$, clear of the stop 7, and the rim can then be rotated to bring the next slot on the plate $f$, over the stop, 7, with which it will engage when the rim is lowered into the die, $d$, ready for the next stroke of the punch. The short arm of the cranked bar, $t$, may be forked as shown in Fig. 8, if necessary.

Figs. 9 and 10 show another form of dividing means for the purpose of my invention, in which the division plate, $f$, is replaced by the split ring, 8 which can be clamped on the wheel rim, $a$, by means of a bolt and wing nut, 9, as shown. The inner circumference of this ring is provided with equidistant notches, $g$, and the ratchet lever, $i$, (Figs. 1, 3, and 5) replaced by the stop, 10, which is so placed that it engages with slots, $g$, when the rim is resting on the die, $d$, and that on lifting the said rim sufficiently for the depression to clear the die, $d$, the stop 10, shall also be clear of the slots, $g$, thus permitting the rotation of the rim, $a$.

A further modification of the dividing means is shown in Figs. 11 and 12 in which a flat unsplit ring 11, is drawn down on to the rim, $a$, by means of the hooks 12, and the wing nuts, 13. The stop 10, is fixed in a similar position to that described with reference to Figs. 9 and 10.

Figs. 13 and 14 show a punching machine for piercing and countersinking wheel rims according to my invention. The wheel or rim, $a$, in which the depressions have been formed as before described, is held by suitable supporting and positioning means so that one of the depressions rests in a suitably shaped block, 14, placed directly under the punching tool, 15. Although the axis of the punch is non-radial relative to the rim, there are no undue side forces acting upon the punch as it engages in the depression instead of on the plain surface of the rim. The punching tool may be provided with a stepped or enlarged portion which after the hole has been punched further operates upon the depression and makes the latter symmetrical about the axis of the punched hole so that when the spoke is inserted, the head or nipple sockets all round closely into the depression. A punching tool, 15, of this description is shown in position in the Fig. 13.

Separate punching and countersinking tools, 16, and 17 may be used, if desired. The punching tool is preferably provided with a collar, 18, acted on by a spring, 19, which holds the rim tight in place and helping to position it while the punching is done.

The wheel supporting and positioning means consists of a long flat bar, 20, carried in two lugs, 21, which are attached to the lugs, 22 of the main frame, of the machine. Through these lugs and arranged so as to bear on the bar, 20, are two set screws, 23, by means of which the said bar can be fixed in any desired position. On this bar and on either side of the main frame of the machine are fixed two carriers, 24, which can be secured in any position on the bar 20, by means of the hand screw, 25, a washer, 26, being interposed between the screw and bar to prevent the latter from being damaged when the screw is tightened. Held in the carrier, 24, by a hand screw, 27, at right angles to the bar, 20, is a short bar, 28, which is provided with a rectangular notched end in which the rim or wheel, $a$, rests.

It will be seen that by positioning the carriers 24, the center of the rim, $a$, can be moved any desired distance from the center line of the punch and therefore the axis of the punched holes will be tangential to any predetermined circle. Further by adjusting the cross bars, 28, the angle between the axes of the punched holes and the plane of the rim can be varied as required. The hole and countersink can therefore be made in any desired direction to insure that the nipple will socket all around.

Automatic feeding means may be provided for effecting the movements of the rim to bring it into position for each punching operation.

If desired two tools may be arranged operating together, one to make the depressions radially or nearly radially, and the other to effect the piercing of the depressions, and if desired the further countersinking of them in the proper tangential direction. The two tools may be arranged to move parallel to one another and may be actuated by one ram or the like.

It will be seen that many modifications may be made in my invention without in any way departing from the spirit of the same.

Having now described my invention what I claim as new and desire to secure by Letters Patent is:—

The process of making metal rims for wire spoked wheels, in which the spokes are to be inclined at various angles consisting in forming substantially hemispherical concave indentations at the points of location of the spokes, perforating the same in the direction of the required angle of the spokes on lines radial to the concave surface of the indentations and providing recesses for the heads of the spoke nipples without substantially reducing the thickness of metal at the edges of the holes.

In testimony whereof, I affix my signature in presence of two witnesses.

JOHN V. PUGH.

Witnesses:
 ALBERT BROWN,
 JOHN RAVEN.